Patented Apr. 9, 1946

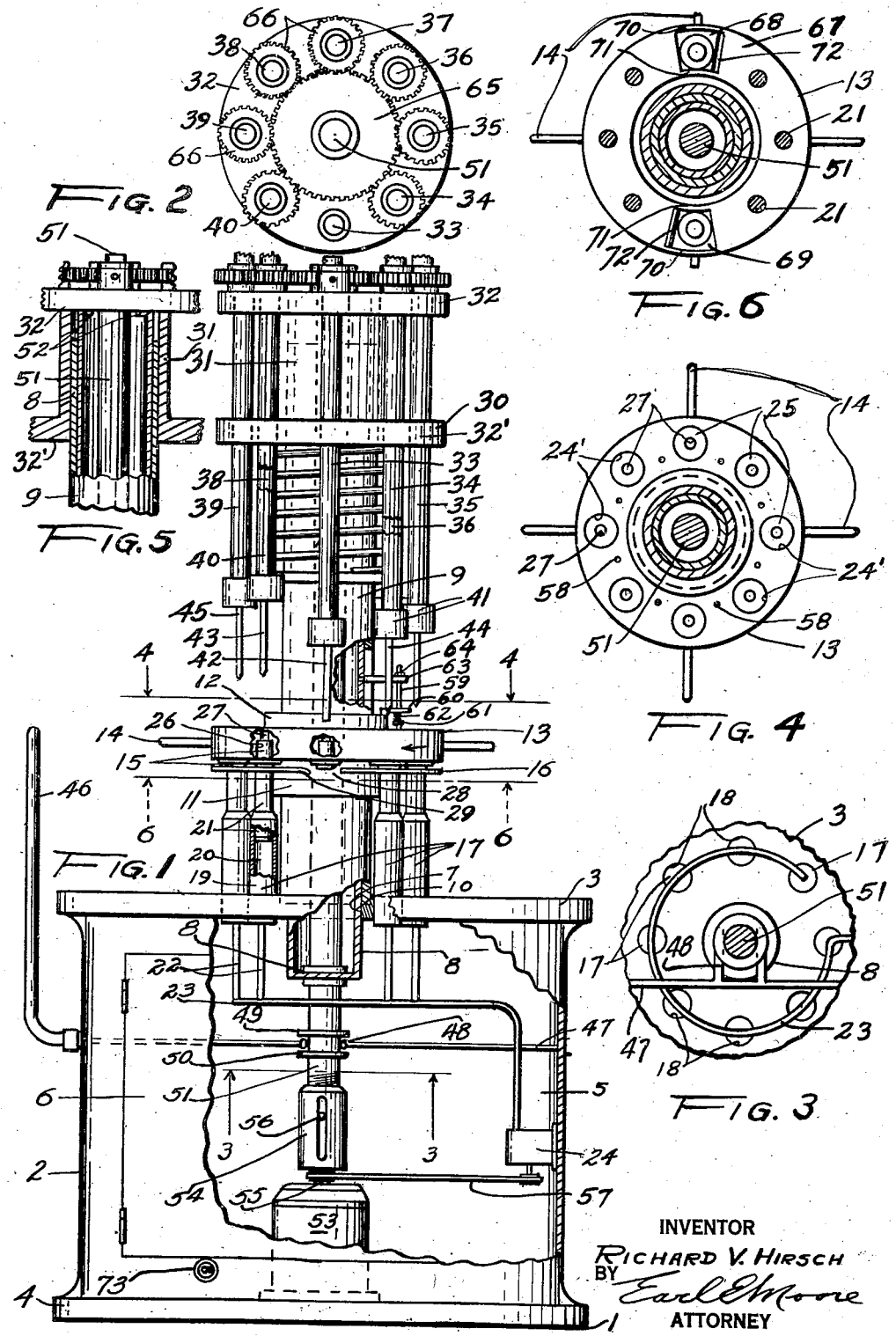

2,398,141

UNITED STATES PATENT OFFICE 2,398,141

DRILLING MACHINE

Richard V. Hirsch, South Gate, Calif.

Application March 29, 1943, Serial No. 480,887

6 Claims. (Cl. 77—64)

This invention relates to drill presses, and especially to drilling machines capable of making a series of short drills into the work in predetermined amounts or drill distances. This sort of drilling is very desirable for drilling small rivets for use in airplane construction. Such rivets are generally of aluminum or of some alloy containing aluminum or magnesium, and such metals, when in the form of small rivets, should be step-drilled in order to avoid changing the grain structure of the metal. Any change in the texture of the finished rivets alters the dependable strength thereof, and such rivets are rejected by the aircraft industry. For these reasons, the drilling machine of this invention is designed to make holes in the rivets by step-drilling, that is, drilling the rivets by a series of short thrusts or cuts rather than running the drill directly through the work.

This invention is also provided with means for rotating the rivets or work while they are being drilled so as to compensate for any deviation from the true center or axis of the finished bore. This is accomplished by turning the work or rivet a number of circular degrees before or after each cut of the drill. In the aircraft industry, the requirements are that the holes must be within 0.002 inch of true center of the rivets, therefore, there is sufficient latitude to correct slightly off-center drilling by rotating the work between the drilling steps. Small minute textural changes in the work is often enough to cause the drill to work a trifle toward one side even though the drill itself is set for perfect center drilling. In view of the foregoing, it is a decided advantage to rotate the work as it is drilled.

One of the principal objects of this invention is to present a drilling mechanism that bores with short thrusts while the work piece or pieces are rotated in segmental fashion.

Another object is to provide a drilling machine that has a plurality of drills arranged to be operated in step formation, each subsequent drill going into the work a little deeper than its predecessor, and in which means are provided to partially rotate the work between each drilling operation.

Still another object is to provide a multiple drilling press that is simple in construction and operation, and which is economical to manufacture and operate.

Other objects, advantages and features of my invention will appear from the accompanying drawing, the subjoined detailed description, the preamble of these specifications and the appended claims.

Applicant is about to illustrate and describe one of the forms of his invention in order to teach one how to make and use the same, but it is to be understood that the drawing and description thereof are not to limit the invention in any sense whatsoever, except as limited by the appended claims.

In the drawing:

Fig. 1 shows the invention in elevational view with parts broken away to show interior elements.

Fig. 2 is a plan view of the top portion of Fig. 1.

Fig. 3 is an inverted horizontal sectional view taken substantially on the line 3—3 of Fig. 1.

Fig. 4 is a horizontal sectional view taken substantially along the line 4—4 of Fig. 1.

Fig. 5 is a vertical sectional view of a top portion of Fig. 1, and

Fig. 6 is an inverted horizontal sectional view of a modified form of the invention, the view being taken as though on the line 6—6 of Fig. 1.

The base and main support for the drill press is indicated by the reference character 1, the same consisting of a cylindrical wall 2 with top disc or plate 3 and a similar disc to act as a bottom 4. These elements form a chamber 5 for housing concealed parts of the drill press. A large door 6 is provided to gain entrance into the chamber so that adjustments can be made to the parts within the chamber. The top plate 3 has a center hole 7 to slidably receive an extension tube 8 which is in an elongated tubular standard member 9, this standard member having a diameter larger than the extension tube and shaped so that its bottom fits immovably onto a rabbeted portion 10 of the plate 3 so that the standard is firmly fixed with respect to the base. The extension tube not only slides through the hole 7 but also through the hollow standard 9.

Surrounding the standard 9 is a collar 11 having a top flange 12 with means, such as a set screw or screws, to hold it in elevated position along the standard. This collar provides a circular bearing for a rotary drill table 13, the table having a plurality of hand rods 14 to facilitate partial rotation of the table as required. This table rests upon the heads of a plurality of rivets 15, which in turn, rest upon a split annular ring or flat spring 16. The table and spring are supported above the plate 3 by a plurality of hydraulic jacks 17 which surround the standard in a circular row and in spaced relation therewith.

Surrounding the hole 7 of the top disc and concentric therewith, is a circular row of holes 18 which are spaced apart in the circumference of the circle formed thereby. The holes are all of the same size and each is adapted to tightly receive the base portion 19 of the hydraulic jacks 17. The bases may be provided with rabbeted portions and also the holes so that the bases will not slide downwardly when under pressure.

All the holes are provided with jacks except the one in front of the operator. Each jack has a tubular base 19 with an oil chamber 20 into which slides a plunger 21, the bottom end of the plunger being provided with an elastic sealed to prevent leakage from the oil chamber. The top ends of all the plungers support the bottom side of the spring 16. To avoid displacement of the spring, the underside thereof may be provided with depressions or pockets to snugly receive the top ends of the plungers. Each chamber of the jacks are supplied with oil under regulated pressure through their respective pipes 22 which branch from the manifold pipe 23, one end of which leads to an oil pump 24 mounted on the inner side of the wall 2 of the base. This pump is provided with the usual check valve and by-pass so as to maintain a desirable predetermined pressure in the jacks 17; the details of the pump are not illustrated for the reason that applicant does not make any claim to the specific construction of the pump.

The drill table has a plurality of holes 24' in circular row and which are equally spaced about the standard and from each other, and which are in registration with the plungers of the jacks 17. Into each of these holes 24' are frozen tightly fitted carefully machined bushings 25 having center holes 26 sized to snugly fit the outer surface of the rivets to be drilled. Each one of the bushings also has a small hole 27 at the top thereof which is of a size to snugly receive the sides of a centering drill or center tap and guide same so that it will make an exact center inverted conical hole for starting the first drill in the exact center of the rivet.

The spring 16 guides the heads of the rivets and holds the rivets tightly against the underside of the bushings 25. In this particular form of the invention, the spring has only one opening or break 28. One end of the spring, designated 29, is bent downward so as to allow the head of the rivets to ride thereon and be forced to the top surface of the spring 16. The opening 28 may be termed the loading and discharging station, for it is through this opening that the unbored rivets are fed into the various bushings as they register therewith, and also through this opening, bored rivets are ejected from the bushings by a push rod.

Near the top of the standard is a drill carriage comprising a spool-like unit 30 having a cylindrical sleeve 31 which snugly slides along the standard, the sleeve having a top flange 32 and a bottom flange 32' integral therewith. These flanges have a plurality of evenly spaced holes forming circular rows about a common center, the holes of the bottom flange being alined with the holes of the top flange. Into these holes, snugly fit the top portions of the drill rods or stems 33 to 40 inclusive arranged as shown. On the bottom ends of the drill stems are the chucks 41. In the chuck of the stem 33 is a push rod 42, in the chuck of the stem 40 is a center drill 43, in the chuck of the stem 34 is a reamer 44, and in all the other chucks are drill bits 45. The push rod, center drill, reamer, and drill bits are all properly centered in their respective chucks and centered with respect to the holes of their respective bushings in the table 13. The points of the drill bits are all positioned on a different horizontal plane so that as the table 13 is turned in the direction indicated by the arrow thereon, each subsequent drill will cut only a small proportionate part of the rivets when the drill carriage 30 has been lowered to its lower limit. The center drill merely provides a starting center for the principal drill bits. The last drill bit, which is next to the reamer 44, completes the hole through the rivet. The reamer runs entirely through the rivet to clean them of burrs. The push rod is adjusted to move low enough to assure ejection of the rivets from the bushings.

The carriage is made to move up and down by operating the handle 46 which is fixed to one end of a rod 47; this rod being journalled in opposed sides of the wall 2, and substantially diametrically opposite one another. The rod has a fork 48 integral therewith which works between two spaced apart rings 49 and 50 which are fixed to a long central shaft 51. The shaft 51 passes upward through the hollow standard and through a central hole in the top flange of the carriage. Where the shaft passes through the flange 32, it is provided with a slip-bearing 52 which holds the shaft centered to the flange. The extension tube 8 has its lower end journalled to the shaft 51 at 8' so that the tube 8 will reciprocate with the shaft but not be rotated thereby. The top of the tube 8 is attached to the carriage 31 by bolts, screws, brazing or any other suitable way along the flange 52 thereof. The shaft is coupled to an electric motor 53, the coupling being accomplished by the slotted sleeve 54 which is screwed onto the shaft 51 and also to an extended part of the motor shaft 55 which motor shaft passes part way through the sleeve. A pin 56 passes through the extended motor shaft and the slot in the sleeve so that the motor can rotate the shaft 51 and at the same time allow the shaft 51 to be freely reciprocated by the fork 48. On the motor shaft is mounted a pulley which connects by the way of a belt 57 with a pulley mounted on the shaft of the oil pump 24.

In order to provide a stop for the table 13 when the bores of the bushings 25 are exactly in alinement with any setting of the bits, reamers, etc., a series of carefully spaced recesses 58 have been arranged between the bushings and into the top surface of the table 13, as shown in Fig. 4 of the drawing. These recesses receive the lower end of a stop-pin 59 which slides vertically in a hole at the end of a bracket 60, the bracket being fixed to the flange of the collar 11. Fixed to the stop-pin is a flange 61 and between this flange and the bracket is a compression spring 62 to hold the stop-pin downwardly so that it will enter the recesses in the table. Whenever it is desired to raise the stop-pin so that the table 13 can be rotated to the next position, the stop-pin is lifted by an arm 63 which is fixed to the tube 8 as shown. A slot is provided in the standard to allow the arm to move axially thereof. Above the free end of the arm, and above the hole therein, the stop-pin is provided with threads and an adjustable nut 64 so that the stop-pin can be set to be lifted at any desired upward position of the tube 8. The shaft 51 and tube 8 are raised by turning the rod 47 by the handle 46. The arm 63 and the slot in the standard through which it passes prevents the tube 8 from turning with the shaft 51.

All the stems, 33 to 40 inclusive, are rotated by the shaft 51 through the main central gear 65 and the respective stem connected gears 66 all at the top of the carriage 31. Each gear is provided with a set screw or key means for firmly fixing them to their respective shafts or drill stems, so that the stems can be raised or lowered without unmeshing their respective connected gears. By this arrangement, the gears on top of the carriage reciprocate with the carriage when the handle 46 is operated to lower and raise the drill bits to and from the work or thing being drilled.

The modified form of the invention shown in Fig. 6 employs all the equipment described above, the only changes made are in the spring which supports the heads of the rivets, and also in the positioning of the various bits, push rods and reamers. Since in this form there are two feed and discharge stations, a jack must be removed, and since the stations are opposite one another, the jack diametrically opposite the front station must be removed. The spring 67 of Fig. 6 is substituted for the spring 16 of Fig. 1 so as to provide two charge and discharge ports or stations 68 and 69 instead of the single one indicated at 28 in Fig. 1. In order to avoid destroying the continuity of the spring 67, the station openings 68 and 69 are cut from the spring a short distance from the inner and outer perimeter thereof so as to provide the ribs 70 and 71 respectively for each opening. The metal of the spring at each lead-in side of the openings is bent slightly downwardly at 72 so as to assure that the rivet heads will readily ride onto the top surface of the spring. When the spring 67 is substituted for the spring 16 of the drill press shown in Fig. 1, the stems 33 and 37 which would then be directly over the openings 68 and 69 respectively, would be provided with push rods 42; this would require that the stem 37 be lowered sufficiently to assure ejection of the rivets at station 69 as well as at the station 68. With this change, rotation of the table being as indicated by the arrow in Fig. 1, the stems 36 and 35, as well as the stems 40 and 39, would be readjusted to new vertical positions to perform the step drilling, and the stems 34 and 38 would each be provided with reamers for clearing away the burrs.

Obviously, the springs 16 and 67 would be provided with additional openings or charge and discharge stations should same be desirable, for instance, when a single drilling step would be sufficient, or in the event the carriage and table are made much larger and equipped with more drilling stems.

Since the motor 53 is connected to the shaft 51 for spinning the drill bits and also connected to the oil pump 24, a single switch 73, toggle type, would be sufficient to control the operation of the rapidly moving parts of the machine. Automatic means may be employed to feed the rivets into the machine and to eject them from the machine into a receptacle suitable for the purpose. Also, automatic means may be employed to operate the rod 47 as well as turn the table 13 from stop to stop as may be required.

I claim as my invention:

1. In a rivet drilling device and the like, a rotatable table, a standard concentric with the table, means for connecting the table with the standard and allowing the table to revolve around the standard, a plurality of spaced apart bores through the table about the perimeter thereof, tool guide and rivet receiving elements in the bores, a ring beneath the table and adjacent thereto having an opening for the passage of the rivets to be drilled, and which is spaceable from the underside of the table to accommodate the heads of the rivets, and a plurality of under plungers exerting pressure on the underside of the ring so as to snugly hold the rivet heads against the underside of the table but which allows the rivet heads to slide between the ring and the table.

2. The device recited in claim 1 wherein the ring at one side of the opening thereof has a portion thereof bent downwardly, said plungers having hydraulic means connected therewith to provide an even pressure under all parts of the ring.

3. The device recited in claim 1 wherein the ring is a flat ribbon-like type and has a plurality of rivet ingress and egress openings therein.

4. In a device for drilling rivets and the like, a rotatable work holding table, a standard concentric with the table and supported from beneath the table, means connecting the table with the standard for revolving about it, a plurality of spaced apart bores in the table forming a circular path within the perimeter of the table, means in each bore for guiding a tool and means in each bore for receiving a rivet, a circular support for rivet heads beneath the table arranged for pressing rivets firmly within their respective receiving means of the table, an opening through the circular support to allow rivet heads to be placed between it and the table, pressure means beneath the circular support for urging it against the underside of the table so as to firmly hold all rivets in their respective receiving means, and a plurality of tools above the circular path formed by the bores and means to support the tools for rotary motion upon the standard.

5. The device recited in claim 4 wherein the circular support is a flat ribbon-like ring, and said pressure means include a plurality of hydraulic operative plungers so as to provide an equal pressure upon all contact points of the plungers against the ring.

6. The device recited in claim 4 wherein the standard comprises an outer main hollow supporting column, a reciprocable hollow column adjacent the main column, and a shaft extending through the reciprocable column and beyond the ends thereof, a drill head supported upon the top end of the reciprocable column and a hollow base supporting the lower end of the main column, power means attached to the lower end of the shaft and transmission means at the top end of the shaft connected with the tools for rotating them, and means connecting a portion of the shaft with the reciprocable column so as to reciprocate it.

RICHARD V. HIRSCH.